(12) United States Patent
Shimosaka et al.

(10) Patent No.: US 12,502,980 B2
(45) Date of Patent: Dec. 23, 2025

(54) CONTROL APPARATUS FOR ELECTRIC VEHICLES

(71) Applicant: DENSO CORPORATION, Kariya (JP)

(72) Inventors: Taroh Shimosaka, Kariya (JP); Satoshi Yasuda, Nagakute (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/654,209

(22) Filed: May 3, 2024

(65) Prior Publication Data
US 2024/0278652 A1     Aug. 22, 2024

Related U.S. Application Data

(63) Continuation of application No. PCT/JP2022/040220, filed on Oct. 27, 2022.

(30) Foreign Application Priority Data

Nov. 5, 2021   (JP) ................................. 2021-181326

(51) Int. Cl.
    *B60L 15/20*   (2006.01)
    *B60L 3/00*    (2019.01)
    *B60L 50/00*   (2019.01)

(52) U.S. Cl.
    CPC ............ *B60L 15/20* (2013.01); *B60L 3/0084* (2013.01); *B60L 50/00* (2019.02); *B60L 2240/423* (2013.01)

(58) Field of Classification Search
    CPC ........ B60L 15/20; B60L 50/00; B60L 3/0084; B60L 2240/423
    See application file for complete search history.

(56) References Cited

U.S. PATENT DOCUMENTS

| | | | | |
|---|---|---|---|---|
| 10,514,421 | B2* | 12/2019 | Reutlinger | ................ H02P 9/48 |
| 10,605,845 | B2* | 3/2020 | Mensler | ................ G01R 31/007 |
| 2009/0061546 | A1* | 3/2009 | Labitzke | ................ H02P 9/305 |
| | | | | 257/E21.531 |
| 2016/0099664 | A1* | 4/2016 | Niwa | .................... H02M 5/458 |
| | | | | 318/400.3 |
| 2017/0093319 | A1* | 3/2017 | Oba | ...................... B60L 3/0084 |
| 2019/0393820 | A1* | 12/2019 | Kim | ...................... B62D 5/0487 |
| 2021/0143763 | A1* | 5/2021 | Chafekar | .............. H02P 29/024 |

FOREIGN PATENT DOCUMENTS

JP         2018-109551 A        7/2018

* cited by examiner

*Primary Examiner* — Hussein Elchanti
(74) *Attorney, Agent, or Firm* — Oliff PLC

(57) ABSTRACT

A second control unit performs a switching control task of repeatedly switching between an on state and an off state of an upper-arm switching device of a voltage converter in response to determination that a monitored terminal voltage across a smoothing capacitor is not lower than or equal to an anomaly determination threshold during failure of a first control unit. The second control unit determines whether the switching control task causes the monitored terminal voltage across the smoothing capacitor to be lower than or equal to the anomaly determination threshold. The second control unit controls, in response to determination that the switching control task causes the monitored terminal voltage across the smoothing capacitor to be lower than or equal to the anomaly determination threshold, at least one motor-generator to perform a limp-home control task of the electric vehicle.

4 Claims, 4 Drawing Sheets

CONTROL APPARATUS FOR ELECTRIC VEHICLES

CROSS REFERENCE TO RELATED APPLICATION

The present application is a bypass continuation application of currently pending international application No. PCT/JP2022/040220 filed on Oct. 27, 2022 designating the United States of America, the entire disclosure of which is incorporated herein by reference, the internal application being based on and claiming the benefit of priority from Japanese Patent Application No. 2021-181326 filed on Nov. 5, 2021.

TECHNICAL FIELD

The present disclosure relates to control apparatuses for electric vehicles.

BACKGROUND

Japanese Patent Application Publication No. 2018-109561 discloses a control apparatus for an electric vehicle equipped with a first motor-generator and a second motor-generator. The control apparatus includes a first electronic control unit, which will be referred to as a first MG-ECU, and a second electronic control unit, which will be referred to as a second MG-ECU. The first MG-ECU is configured to control the first motor-generator, and the second MG-ECU is configured to control the second motor-generator.

SUMMARY

The control apparatus for the electric vehicle equipped with the first and second motor-generators, which includes the first and second MG-ECUs, is configured such that, if one of the first and second MG-ECUs has malfunctioned, the other of the first and second MG-ECUs, which is operating normally, is configured to perform limp-home control. The limp-home control causes the running electric vehicle to travel to a safety location.

That is, because the control apparatus set forth above includes the first and second MG-ECUs for the first and second motor-generators, even if there is an anomaly in one of the first and second MG-ECUs, the other of the first and second MG-ECUs, which is operating normally, is able to perform the limp-home control.

Unfortunately, such an electric vehicle, which is equipped with a single running motor-generator and a single MG ECU for controlling the single running motor-generator, may have difficulty in performing the limp-hope control if the single MG ECU has malfunctioned.

A voltage booster, such as a voltage converter, of an electric vehicle boosts a direct-current (DC) voltage outputted from a battery installed in a vehicle, and supplies the converted DC voltage to an inverter through a smoothing capacitor. The inverter of the electric vehicle converts the boosted DC voltage into an alternating-current (AC) voltage, and supplies the converted AC voltage to a motor-generator. The motor-generator causes, based on the supplied AC voltage, to travel.

On the other hand, when power, i.e., regenerative power, is generated based on rotation of the motor-generator during deceleration of the electric vehicle, the inverter converts the regenerative power into a DC voltage, and supplies the converted DC voltage to the voltage converter through the smoothing capacitor. The voltage converter steps down the DC voltage, and supplies the stepped-down DC voltage to the battery, resulting in the stepped-down DC voltage being recovered in the battery.

Such an electric vehicle is configured such that a control apparatus can include both a first function of controlling the motor-generator and a second function of controlling the voltage converter.

Unfortunately, if there is an anomaly in the second function of the control apparatus while the electric vehicle is traveling, for example, along a freeway, the control apparatus may have difficulty in controlling the voltage converter. This may result in the charge based on the regenerative power stored in the smoothing capacitor being unrecoverable in the battery. This may result in a voltage based on the charge stored in the smoothing capacitor increasing abnormally. In response to such an abnormal increase in the voltage across the smoothing capacitor, an overvoltage protection function against the smoothing capacitor, which is previously installed in the electric vehicle, works, so that the limp-home control may not be carried out until the voltage across the smoothing capacitor becomes stable.

From the above viewpoint, the present disclosure seeks to provide control apparatuses for an electric vehicle, each of which is capable of suppressing, when the electric vehicle is traveling, an abnormal increase in a voltage based on regenerative power even if it is difficult to control a voltage converter.

An exemplary measure of the present disclosure provides a control apparatus for an electric vehicle. The control apparatus includes a first control unit configured to control at least one motor-generator. The motor-generator is configured to drive one or more driving wheels of an electric vehicle using an alternating-current voltage based on a direct-current voltage that is boosted by a voltage converter and supplied thereto through a smoothing capacitor. The voltage converter includes an upper-arm switch and a lower-arm switch. A malfunction determiner is configured to determine whether the first control unit has malfunctioned during traveling of the electric vehicle. A second control unit is provided as a redundant control unit for the first control unit.

The second control unit is configured to monitor a terminal voltage across the smoothing capacitor, and determine whether the monitored terminal voltage across the smoothing capacitor is lower than or equal to a predetermined anomaly determination threshold in response to determination that the first control unit has malfunctioned. The second control unit is configured to perform a switching control task of repeatedly switching between an on state and an off state of the upper-arm switching device of the voltage converter in response to determination that the monitored terminal voltage across the smoothing capacitor is higher than the predetermined anomaly determination threshold. The second control unit is configured to determine whether the switching control task causes the monitored terminal voltage across the smoothing capacitor to be lower than or equal to the predetermined anomaly determination threshold. The control unit is configured to control, in response to determination that the switching control task causes the monitored terminal voltage across the smoothing capacitor to be lower than or equal to the predetermined anomaly determination threshold, the at least one motor-generator to perform a limp-home control task of the electric vehicle.

The second control unit of the electric vehicle according to the exemplary measure of the present disclosure is configured to, in response to determination that the first control unit has malfunctioned and in response to determination that the monitored terminal voltage across the smoothing capacitor is higher than the predetermined anomaly determination threshold, perform the switching control task of repeatedly switching between the on state and the off state of the upper-arm switching device of the voltage converter. The switching control task dissipates, from the smoothing capacitor, charge stored in the smoothing capacitor during a regenerative mode of the electric vehicle thus discharging, from the smoothing capacitor, the charge stored in the smoothing capacitor.

This therefore prevents an abnormal increase in the terminal voltage across the smoothing capacitor during the regenerative mode of the electric vehicle, resulting in an operation mode of the electric vehicle being safe and immediately changing to the limp-home mode.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENTS

The following describes a control apparatus for an electric vehicle according an exemplary embodiment with reference to the accompanying drawings. The present disclosure is not limited to the following exemplary embodiment.

Figure 1:
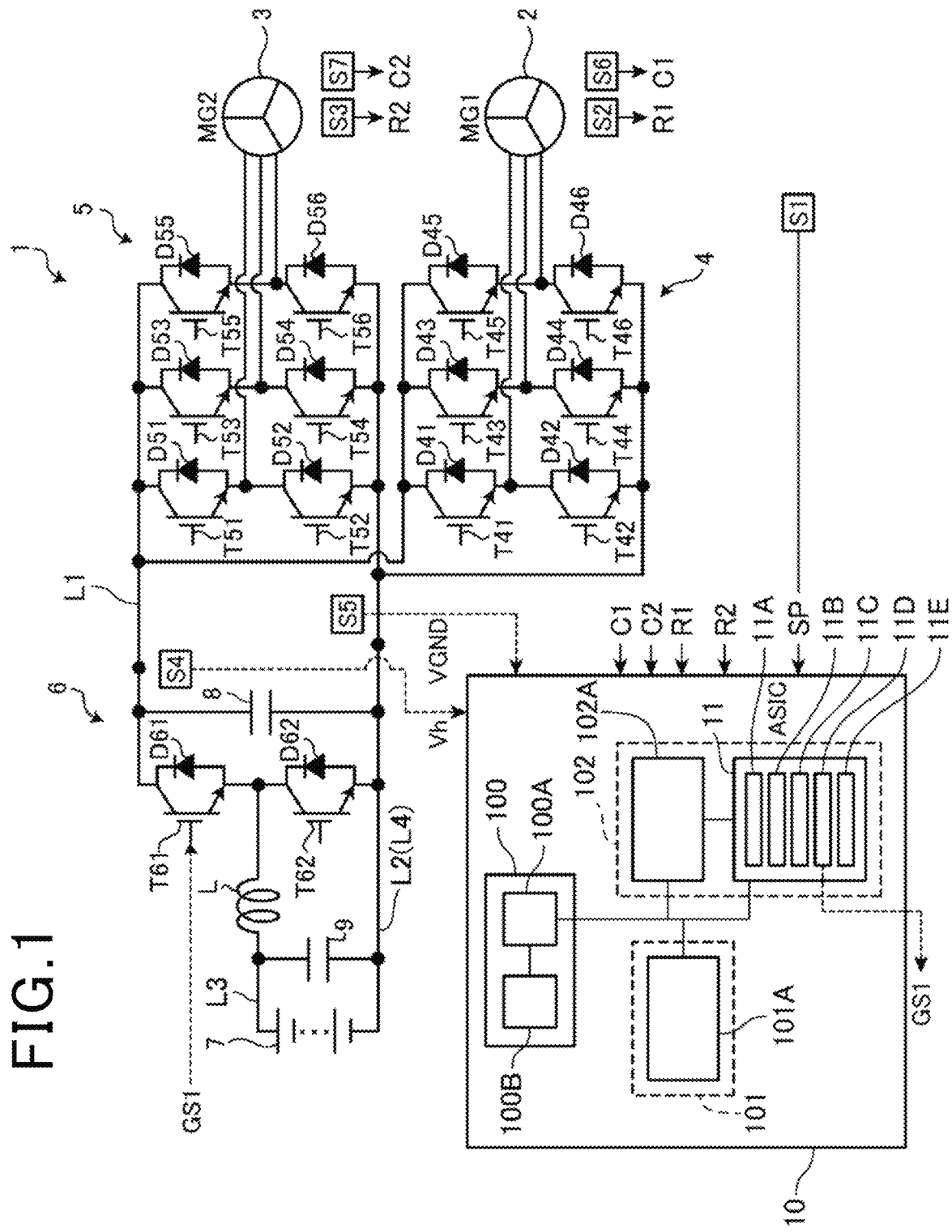
FIG. 1 is a diagram illustrating a schematic configuration of an electric-vehicle control system according to an exemplary embodiment of the present disclosure.

FIG. 1 is a diagram illustrating a schematic configuration of an electric-vehicle control system according to the exemplary embodiment.

An electric vehicle 1 includes, as illustrated in FIG. 1, a first motor-generator (MG1) 2, a second motor-generator (MG2) 3, a first inverter 4, a second inverter 5, a voltage converter 6, a battery 7, and a control apparatus 10.

Each of the first and second motor-generators 2 and 3, which is used as a running power source, is a motor-generator capable of serving as both a motor and a generator. The electric vehicle 1 is configured such that at least one of (1) power, i.e., torque, generated by the first motor-generator 2 and (ii) power, i.e., torque, generated by the second motor-generator 3 drives predetermined driving wheels of the electric vehicle 1.

For example, the first and second motor-generators 2 and 3 are joined to the driving wheels through a power train of the electric vehicle 1.

Specifically, the power train includes a planetary gear system that is comprised of a plurality of rotational gears, and the first and second motor-generators 1 and 2 can be selectively coupled to respective two of the plurality of rotational gears.

For example, the control apparatus 10 can change two of the plurality of rotational gears, which are to be selectively coupled to the respective first and second motor-generators 1 and 2, to accordingly implement any one of the following first to fourth operation modes:

The first operation mode is that the first motor-generator 2 serves as a power generator, and the second motor-generator 3 serves as a motor.

The second operation mode is that the first motor-generator 2 serves as a motor, and the second motor-generator 3 serves as a power generator.

The third operation mode is that each of the first and second motor-generators 2 and 3 serves as a motor.

The fourth operation mode is that each of the first and second motor-generators 2 and 3 serves as a power generator.

Each of the first and second motor-generator 2 and 3 is configured as, for example, a synchronous motor that includes a rotor, a plurality of permanent magnets, a stator, and three-phase (U-, V-, and W-phase) coils. The plurality of permanent magnets of each of the first and second motor-generators 2 and 3 are embedded in the rotor of the corresponding one of the first and second motor-generators 2 and 3. The three-phase coils of each of the first and second motor-generators 2 and 3 are wound in or around the stator of the corresponding one of the first and second motor-generators 2 and 3. The three-phase coils wound in or around the stator of the first motor-generator 2 are electrically connected to the first inverter 4. The three-phase coils wound in or around the stator of the second motor-generator 3 are electrically connected to the second inverter 5.

Each of the first and second inverters 4 and 5 is a power converter configured to convert direct-current (DC) power from the battery 7 of the electric vehicle 1 into alternating-current (AC) power, and supply the AC power to the corresponding one of the first and second motor-generators 2 and 3.

Each of the first and second inverters 4 and 5 is connected to high-voltage power lines provided in the electric vehicle 1. The high-voltage power lines include a positive busbar L1 and a negative busbar L2.

The first inverter 4 is provided between the first motor-generator 2 and the voltage converter 6. The second inverter 5 is provided between the second motor-generator 3 and the voltage converter 6.

The first inverter 4 is comprised of an electric circuit, i.e., an inverter circuit, that includes a plurality of switching devices for supplying phase currents to the respective three-phase coils of the first motor-generator 2.

Specifically, the first inverter 4 is comprised of six switching devices T41 to T46 and six diodes D41 to D46. The first inverter 4 is configured such that selective on-off operations of the switching devices T41 to T46 for each phase of the three-phase convert the DC power to the AC power.

The switching devices T41 to T46 are divided into three pairs of two switches for each phase of the three-phases. Specifically, the switching devices T41 to T46 include, for example, a first pair of two switching devices T41 and T42 for the U-phase, a second pair of two switching devices T43 and T44 for the V-phase, and a third pair of two switching devices T45 and T46 for the W-phase.

The switching device T41 of the first pair, the switching device T43 of the second pair, and the switching device T45 of the third pair are connected to the positive busbar L1 included in the high-voltage power lines; each of the switching devices T41, T43, and T45 serves as a current-source switching device. The switching device T42 of the first pair, the switching device T44 of the second pair, and the switching device T46 of the third pair are connected to the negative busbar L2 included in the high-voltage power lines; each of the switching devices T42, T44, and T46 serves as a current-sink switching device.

Specifically, the first pair of switching devices T41 and T42, the second pair of switching devices T43 and T44, and the third pair of switching devices T45 and T46, each of which serves as a pair of current-source and current-sink switching devices of the corresponding phase, respectively constitute the upper- and lower-arm switching devices for the three-phases.

Each of the diodes D41 to D46 is connected in antiparallel to the corresponding one of the switching devices T41 to T46.

The paired switching devices of each phase are connected to one another at a connection point, and the connection point between the paired switching devices of each phase is connected to the corresponding-phase coil of the first motor-generator 2.

Specifically, the switching devices T41 and T42 of the first pair for the U-phase are connected in series, and the connection point between the switching devices T41 and T42 is connected to a first end of the U-phase coil of the first motor-generator 2. Similarly, the switching devices T43 and T44 of the second pair for the V-phase are connected in series, and the connection point between the switching devices T43 and T44 is connected to a first end of the V-phase coil of the first motor-generator 2. The switching devices T45 and T46 of the third pair for the W-phase are connected in series, and the connection point between the switching devices T45 and T46 is connected to a first end of the WV-phase coil of the first motor-generator 2.

For example, second ends of the U-, V-, and W-phase coils of the first motor-generator 2, which are opposite to the first ends thereof, are connected to one another at a neutral point. The U-, V-, and W-phase coils are connected to one another in a star (Y) configuration, so that the U-, V-, and W-phase coils have a phase difference of 120 degrees from one another.

Because the first inverter 4 is electrically connected to the battery 7, the first motor-generator 2 can operate based on the DC power supplied from the battery 7.

The first inverter 4 is configured to convert DC power, i.e., a DC voltage, which is supplied from the battery 7 and boosted by the voltage converter 6, into AC power, i.e., three-phase AC voltages, and supply the three-phase AC voltages to the first motor-generator 2, thus driving the first motor-generator 2.

For example, when the DC voltage boosted by the voltage converter 6 is applied to the first inverter 4, a first motor-generator control apparatus, i.e., a first MG-ECU, described later, is configured to perform complementary on-off operations of each of the first pair of switching devices T41 and T42, the second pair of switching devices T43 and T44, and the third pair of switching devices T45 and T46 while adjusting the percentage of the on-duration of each switching device, thus supplying the three-phase AC voltages to the first motor-generator 2. The first motor-generator 2 generates, based on the three-phase AC voltages, a rotating magnetic field in the stator through the three-phase coils. Repulsion/attraction between the rotating magnetic field generated in the stator and the permanent magnets of the rotor cause the first motor-generator 2, i.e., the rotor of the first motor-generator 2, to be rotatably driven, thus generating torque.

Like the first inverter 3, the second inverter 5 is comprised of an electric circuit, i.e., an inverter circuit, that includes a plurality of switching devices for supplying phase currents to the respective three-phase coils of the second motor-generator 3.

Specifically, the second inverter 5 is comprised of six switching devices T51 to T56 and six diodes D51 to D56.

The connection relationship between the switching devices T51 to T56 and the diodes D51 to D56, the connection relationship of the switching devices T51 to T56 with respect to the second motor-generator 3, and the connection relationship of the switching devices T51 to T56 with respect to the battery 7 are respectively identical to the connection relationship between the switching devices T41 to T46 and the diodes D41 to D46, the connection relationship of the switching devices T41 to T46 with respect to the first motor-generator 2, and the connection relationship of the switching devices T41 to T46 with respect to the battery 7. Accordingly, descriptions of the connection relationship between the switching devices T51 to T56 and the diodes D51 to D56, the connection relationship of the switching devices T51 to T56 with respect to the second motor-generator 3, and the connection relationship of the switching devices T51 to T56 with respect to the battery 7 are omitted.

Because the second inverter 5 is electrically connected to the battery 7, the second motor-generator 3 can operate based on the DC power supplied from the battery 7.

The second inverter 5 is configured to convert the DC power, i.e., the DC voltage, which is supplied from the battery 7 and boosted by the voltage converter 6, into AC power, i.e., three-phase AC voltages, and supply the three-phase AC voltages to the second motor-generator 3, thus driving the second motor-generator 3.

For example, when the DC voltage boosted by the voltage converter 6 is applied to the second inverter 5, a second motor-generator control apparatus, i.e., a second MG-ECU, described later, is configured to perform complementary on-off operations of each of the first pair of switching devices T51 and T52, the second pair of switching devices T53 and T54, and the third pair of switching devices T55 and T56 while adjusting the percentage of the on-duration of each switching device, thus supplying the three-phase AC voltages to the second motor-generator 3. The second motor-generator 3 generates, based on the three-phase AC voltages, a rotating magnetic field in the stator through the three-phase coils. Repulsion/attraction between the rotating magnetic field generated in the stator and the permanent magnets of the rotor cause the second motor-generator 3, i.e., the rotor of the second motor-generator 3, to be rotatably driven, thus generating torque.

The voltage converter 6 is configured to boost the DC voltage of the battery 7, and supply the boosted DC voltage to each of the first and second inverters 4 and 5. Additionally, the voltage converter 6 is configured to step down a DC voltage, i.e., a regenerative voltage, supplied from the first or second motor-generator 2 or 3 through the corresponding inverter 4 or 5, thus supplying the stepped-down DC voltage to the battery 7. The voltage converter 6 is connected to the high-voltage power lines connected to the first and second inverters 4 and 5. The voltage converter 6 is also connected to low-voltage power lines connected to the battery 7; the low-voltage power lines include a positive busbar L3 and a negative busbar L4. The negative busbar L4 is common to the negative busbar L2 included in the high-voltage power lines.

The voltage converter 6 is comprised of a pair of first and second switching devices T61 and T62, and diodes D61 and D62, and a inductor, i.e., a reactor, L. The diodes D61 and D62 are connected in antiparallel to the respective first and second switching devices T61 and T62. In the voltage converter 6, the first switching device T61 serving as an upper-arm switching device and the second switching device T62 serving as a lower-arm switching device are connected in series. The first switching device T61 is connected to the positive busbar L1 of the high-voltage power lines. The second switching device T62 is connected to the first switching device T61 and to the common negative busbar L2 (L4) of the low-voltage power lines. The common negative busbar L2 (L4) constitutes a common signal ground included in an electric circuit that includes the battery 7, the voltage converter 6, the first inverter 4, and the second inverter 5.

The Inductor L is connected to a connection point between the first and second switching devices T61 and T62, and also connected to the positive busbar L3 of the low-voltage power lines.

The control apparatus 10 is configured to control switching on and off of each of the first and second switching devices T61 and T62.

That is, the control apparatus 10 is configured to perform on-off switching control of each of the first and second switching devices T61 and T62 of the voltage converter 6. Execution of the on-off switching control can perform (I) A first task of boosting the DC voltage of the battery 7, i.e., the DC voltage across the positive busbar L3 and the negative busbar L4 (L2) of the low-voltage power lines, and thereafter supplying the boosted DC voltage to the high-voltage power lines (II) A second task of stepping down the DC voltage across the positive busbar L1 and the negative busbar L2 (L4) of the high-voltage power lines, and thereafter supplying the stepped-down DC voltage to the low-voltage power lines A smoothing capacitor 8 is provided between the positive busbar L1 and the negative busbar L2 of the high-voltage power lines, and a smoothing capacitor 9 is provided between the positive busbar L3 and the negative busbar L4 of the low-voltage power lines.

The battery 7 is a chargeable and dischargeable DC power supply, and has a positive electrode and a negative electrode. The positive electrode of the battery 7 is connected to the positive busbar L3 of the low-voltage power lines, and the negative electrode of the battery 7 is connected to the negative busbar L4 of the low-voltage power lines. The battery 7 is comprised of, for example, a secondary battery, such as a lithium-ion battery, a nickel-hydrogen battery, or a nickel-metal-hydride battery.

The battery 7 is configured to discharge the DC voltage toward the first and second inverters 4 and 5 through the voltage converter 5, and the battery 7 is configured to store DC power supplied from each of the first inverter 4 and the second inverter. When the electric vehicle 1 operates in a power running mode, the DC power stored in the battery 7 can be supplied to the first motor-generator 2 and/or the second motor-generator 3. When the electric vehicle 1 operates in a regenerative mode, the first motor-generator 2 and/or the second motor-generator 3 serves as a power generator, so that the DC power based on the AC power generated by the first motor-generator 2 and/or the second motor-generator 3 can be charged in the battery 7.

The voltage converter 6 of the electric circuit, which has the above configuration, of the electric vehicle 1 boosts the DC voltage from the battery 7, and supplies the boosted DC voltage to at least one of the first and second inverters 4 and 5.

The first inverter 4 is configured to convert the DC voltage supplied from the voltage converter 6 into the three-phase AC voltage, and supply the three-phase AC voltage to the first motor-generator 2. The first motor-generator 2 drives based on the three-phase AC voltages supplied from the first inverter 4.

Similarly, the second inverter 5 is configured to convert the DC voltage supplied from the voltage converter 6 into the three-phase AC voltage, and supply the three-phase AC voltage to the second motor-generator 3. The second motor-generator 3 drives based on the three-phase AC voltages supplied from the second inverter 5.

The control apparatus 10 is configured to control each of the first motor-generator 2, the second motor-generator 3, the first inverter 4, the second inverter 5, and the voltage converter 6.

The control apparatus 10 is comprised of electronic control units (ECUs) for controlling the electric vehicle 1.

The control apparatus 10 includes a microcomputer 100, and the microcomputer 100 includes a CPU 100A serves as a processor that performs various computing operations, and a storage unit 100B, such as at least a RAM and a ROM. The storage unit 100B stores programs that cause the CPU 100A to perform various computing operations, and also stores data required for the various computing operations. The microcomputer 100 also includes an unillustrated input/output (I/O) Interface for the microcomputer 100.

The electric vehicle 1 is equipped with various sensors.

The various sensors include a vehicle speed sensor S1, a first rotational angle sensor S2, a second rotational angle sensor S3, a first voltage sensor S4, and a second voltage sensor S5.

The vehicle speed sensor S1 is configured to measure a speed SP of the electric vehicle 1. The first rotational angle sensor S2 is configured to measure a rotational angle R1 of the first motor-generator 2, i.e., its rotor. The second rotational angle sensor S3 is configured to measure a rotational angle R2 of the second motor-generator 3, i.e., its rotor. The first voltage sensor S4 is configured to measure a voltage Vh at the positive electrode of the smoothing capacitor 8, and the second voltage sensor S5 is configured to measure a voltage VGND at the negative busbar L2 (L4) of the high-voltage power lines as a common ground voltage VGND.

The various sensors additionally include a first current sensor S6 and a second current sensor S7.

The first current sensor S6 is configured to measure a phase current C1 flowing through each of the three-phase coils of the first motor-generator 2, and the second current sensor S7 is configured to measure a phase current C2 flowing through each of the three-phase coils of the second motor-generator 3.

A vehicle speed measurement signal indicative of the vehicle speed SP measured by the vehicle speed sensor S1, a first rotational-angle measurement signal indicative of the rotational angle R1 of the first motor-generator (rotor) 2 measured by the first rotational-angle sensor S2, and a second rotational-angle measurement signal indicative of the rotational angle R2 of the second motor-generator (rotor) 3 measured by the second rotational-angle sensor S3 are inputted to the control apparatus 10. Similarly, a first voltage measurement signal indicative of the voltage Vh at the positive electrode of the smoothing capacitor 8 measured by the first voltage sensor S4 and a second voltage measurement signal indicative of the voltage (common ground voltage) VGND at the negative busbar L2 (L4) of the high-voltage power lines measured by the second voltage sensor S5 are inputted to the control apparatus 10. Additionally, a first current measurement signal indicative of each phase current C1 measured by the first current sensor S6 and a second current measurement signal indicative of each phase current C2 measured by the second current sensor S7 are inputted to the control apparatus 10.

The control apparatus 10 includes a first MG electronic control unit (ECU) 101 for controlling the voltage converter 6, the first inverter 4, and the first motor-generator 2, and a second MG electronic control unit (ECU) 102 for controlling the voltage converter 6, the second inverter 5, and the second motor-generator 3.

The first MG ECU 101 includes a first microcontroller 101A serving as a control unit for controlling, based on the measurement signals outputted from the sensors S1 to S7 and inputted to the control apparatus 10, the voltage converter 6, the first inverter 4, and the first motor-generator 2.

For example, when the first rotational-angle measurement signal sent from the first rotational-angle sensor S2 is inputted to the control apparatus 10, i.e., the first MG-ECU 101, the first microcomputer 101A performs computing operations for control of the first motor-generator 2, which include, for example, an operation of computing, based on the first rotational-angle measurement signal, the rotational speed, i.e., the RPM, of the first motor-generator 2. The first microcomputer 101A generates, based on a result of the computing operations, a first converter control signal for controlling the voltage converter 6 and a first inverter control signal for controlling the first inverter 4, and outputs the first converter control signal to the voltage converter 6 and the first inverter control signal to the first inverter 4.

The first converter signal for controlling the voltage converter 6 is a switching control signal for controlling on-off switching operations of the first and second switching devices T61 and T62 of the voltage converter 6. The first inverter control signal is a switching control signal for controlling on-off switching operations of the switching devices T41 to T46 of the first inverter 4.

The first microcontroller 101A set forth above is configured to control the voltage converter 6 and the first inverter 4 to accordingly control the three-phase AC voltages and three-phase AC currents supplied to the first motor-generator 2.

The second MG ECU 102 includes a second microcontroller 102A serving as a control unit for controlling, based on the measurement signals outputted from the sensors S1 to S7 and inputted to the control apparatus 10, the voltage converter 6, the second inverter 5, and the second motor-generator 3. The second MG ECU 102 also includes an application specific integrated circuit (ASIC) 11.

For example, when the second rotational-angle measurement signal sent from the second rotational-angle sensor S3 is inputted to the control apparatus 10, i.e., the second MG-ECU 102, the second microcomputer 102A performs computing operations for control of the second motor-generator 3, which include, for example, an operation of computing, based on the second rotational-angle measurement signal, the rotational speed, i.e., the RPM, of the second motor-generator 3. The second microcomputer 102A generates, based on a result of the computing operations, a second converter control signal for controlling the voltage converter 6 and a second inverter control signal for controlling the second inverter 5, and outputs the second converter control signal to the voltage converter 6 and the second inverter control signal to the second inverter 5.

The second converter signal for controlling the voltage converter 6 is a switching control signal for controlling on-off switching operations of the first and second switching devices T61 and T62 of the voltage converter 6. The second inverter control signal is a switching control signal for controlling on-off switching operations of the switching devices T51 to T56 of the second inverter 5.

The second microcontroller 102A set forth above is configured to control the voltage converter 6 and the second inverter 5 to accordingly control the three-phase AC voltages and three-phase AC currents supplied to the second motor-generator 3.

The ASIC 11 has a function of performing a control task, i.e., a limp-home control task, that instructs the electric vehicle 1 to travel in a limp-home mode. That is, the limp-home control task is to cause the running electric vehicle 1 to travel up to a safely location. The ASIC 11 stores a program, i.e., a fail-safe logic program, for performing the limp-home control task. That is, the ASIC 11 includes a limp-home controller described later.

The second microcontroller 102A of the second MG-ECU 102 has a computing-operation function of performing the computing operations for controlling the second motor-generator 3, and the ASIC 11 of the second MG-ECU 102 has peripheral functions. In other words, the second microcontroller 102A serves as a first control unit, and the ASIC 11 serves as a second control unit. The second microcontroller 102A is communicably connected to the ASIC 11.

The second microcontroller 102A is configured as a hardware device dedicated to control the second motor-generator 3. For example, the second microcontroller 102A includes a resolver digital converter (RDC) for acquiring the rotational angle of the second motor-generator 3 based on the second rotational-angle measurement signal indicative of the rotational angle R2 of the second motor-generator (rotor) 3 measured by the second rotational-angle sensor S3. The second microcontroller 102A includes a dedicated analog-digital converter (dedicated ADC) for acquiring a value of a current flowing each phase coil of the second motor-generator 3. The second microcontroller 102A includes an enhanced motor control unit (EMU) serving as an intellectual property (IP) core for controlling the second motor-generator 3.

A part or the whole of the hardware configuration of the second microcontroller 102A are installed in the ASIC 11. If the ASIC 11 includes the RDC, the second rotational-angle measurement signal sent from the second rotational-angle sensor S3 is inputted to the ASIC 11. If the ASIC includes the dedicated ADC, the second current measurement signal indicative of each phase current C2 of the second motor-generator 3 measured by the second current sensor S7.

Additionally, the first voltage measurement signal indicative of the voltage Vh at the positive electrode of the smoothing capacitor 8 measured by the first voltage sensor S4 and the second voltage measurement signal indicative of the voltage (common ground voltage) VGND at the negative busbar L2 (L4) of the high-voltage power lines measured by the second voltage sensor S5 are inputted to the ASIC 11.

That is, the ASIC 11 includes a monitor unit 11A and a storage unit 11B. The monitor unit 11A is configured to monitor a terminal voltage across the smoothing capacitor 8 based on (1) the first voltage measurement signal indicative of the voltage Vh at the positive electrode of the smoothing capacitor 8 measured by the first voltage sensor S4 and (ii) the second voltage measurement signal indicative of the voltage (common ground voltage) VGND at the negative busbar L2 (L4) of the high-voltage power lines measured by the second voltage sensor S5.

The storage unit 11B is configured to store a threshold, i.e., an anomaly determination threshold, for determination of whether there is an anomaly in the terminal voltage across the smoothing capacitor 8.

The ASIC 11 further includes a determiner 11C. The determiner 11C is configured to compare the terminal voltage, which will be referred to as a Vh-VGND), with the anomaly determination threshold to accordingly determine whether there is an anomaly in the terminal voltage Vh-VGND across the smoothing capacitor 8.

Specifically, the determiner 11C is configured to determine that there is an anomaly in the terminal voltage across the smoothing capacitor 8 in response to determination that the terminal voltage Vh-VGND across the smoothing capacitor 8 is higher than the anomaly determination threshold.

The ASIC 11 includes a converter controller 11D configured to control the voltage converter 6 in response to determination that there is an anomaly in the terminal voltage across the smoothing capacitor 8.

Specifically, the converter controller 11D performs a switching control task of repeatedly switching the upper-arm first switching device T61 of the voltage converter 6 on and off in response to determination that there is an anomaly in the terminal voltage across the smoothing capacitor 8. At that time, the converter controller 11D maintains the second switching device T62 in an off state. The switching control task is additionally configured to repeatedly output an on/off instruction, i.e., a gate instruction, GS1 to the first switching device T61 of the voltage converter 6. The gate instructions GS1 repeatedly outputted from the ASIC 11 cause the first switching device T61 to be repeatedly switched from the on state to the off state, resulting in the terminal voltage Vh-VGND across the smoothing capacitor 8 being stepped down.

The ASIC 11 includes a limp-home controller 11E configured to change a control mode thereof to a limp-home control mode, and perform the limp-home control task.

Specifically, the limp-home controller 11E has a map indicative of a correlative relationship between (i) values, i.e., safety rotational-speed values, of the rotational speed of the second motor-generator 3 and (ii) values of torque corresponding to the respective safety rotational-speed values; the safety rotational-speed values of the second motor-generator 3 correspond to respective safety traveling-speed values, i.e., low speed values, of the electric vehicle 1 during traveling of the electric vehicle 1 in the limp-home mode.

The limp-home controller 11E is configured to perform, based on the vehicle speed SP measured by the vehicle speed sensor S1 and the map, the limp-home control task of performing on-off switching operations of each of the switching devices T51 to T56 of the second inverter 5 to accordingly perform feedback control of the torque of the second motor-generator 3. The torque feedback control of the second motor-generator 3 causes a value of the vehicle speed SP of the electric vehicle 1, i.e., the rotational speed of the second motor-generator 3, to track a selected one of the safety traveling-speed values, i.e., a corresponding one of the safety rotational-speed values of the second motor-generator 3. The second motor-generator 3, which is controlled based on the limp-home control task, causes the electric vehicle 1 to travel in the limp-home mode.

The microcomputer 100 included in the control apparatus 10 serves as a malfunction determiner configured to determine whether each of the first microcontroller 101A of the first MG ECU 101 and the second microcontroller 102A of the second MG ECU 102 has malfunctioned. The microcomputer 100 and the ASIC 11 are communicably connected to each other. That is, when determining that the first microcontroller 101A or the second microcontroller 102A has malfunctioned, the microcomputer 100 outputs, to the ASIC 11, a signal indicative of the malfunction of the first microcontroller 101A or the second microcontroller 102A. Hereinafter, if there is no need to distinguish between the first microcontroller 101A and the second microcontroller 102A, each of the first and second microcontrollers 101A and 102A will be referred to as a microcontroller 101A (102A).

The ASIC 11 of the control apparatus 10 described above is configured as a redundant control unit for the microcontroller 101A (102A).

Specifically, the ASIC 101 has a fail-safe function that includes a determination function of determining whether the microcontroller 101A (102A) has malfunctioned, such as whether there is a failure of one or more functions in the microcontroller 101A (102A). The fail-safe function includes a limp-home control function of performing, in response to determination that the microcontroller 101A (102A) has malfunctioned, the limp-home control task to accordingly cause the electric vehicle 1 to travel in the limp-home mode.

The malfunction function determination function of the ASIC 11 additionally includes a function of monitoring whether the terminal voltage Vh-VGND is abnormally high, and controlling the voltage converter 6 to dissipate, from the smoothing capacitor 8, any abnormal amount of charge stored in the smoothing capacitor 8 to the battery 7, thus charging the battery 7.

Figure 2:
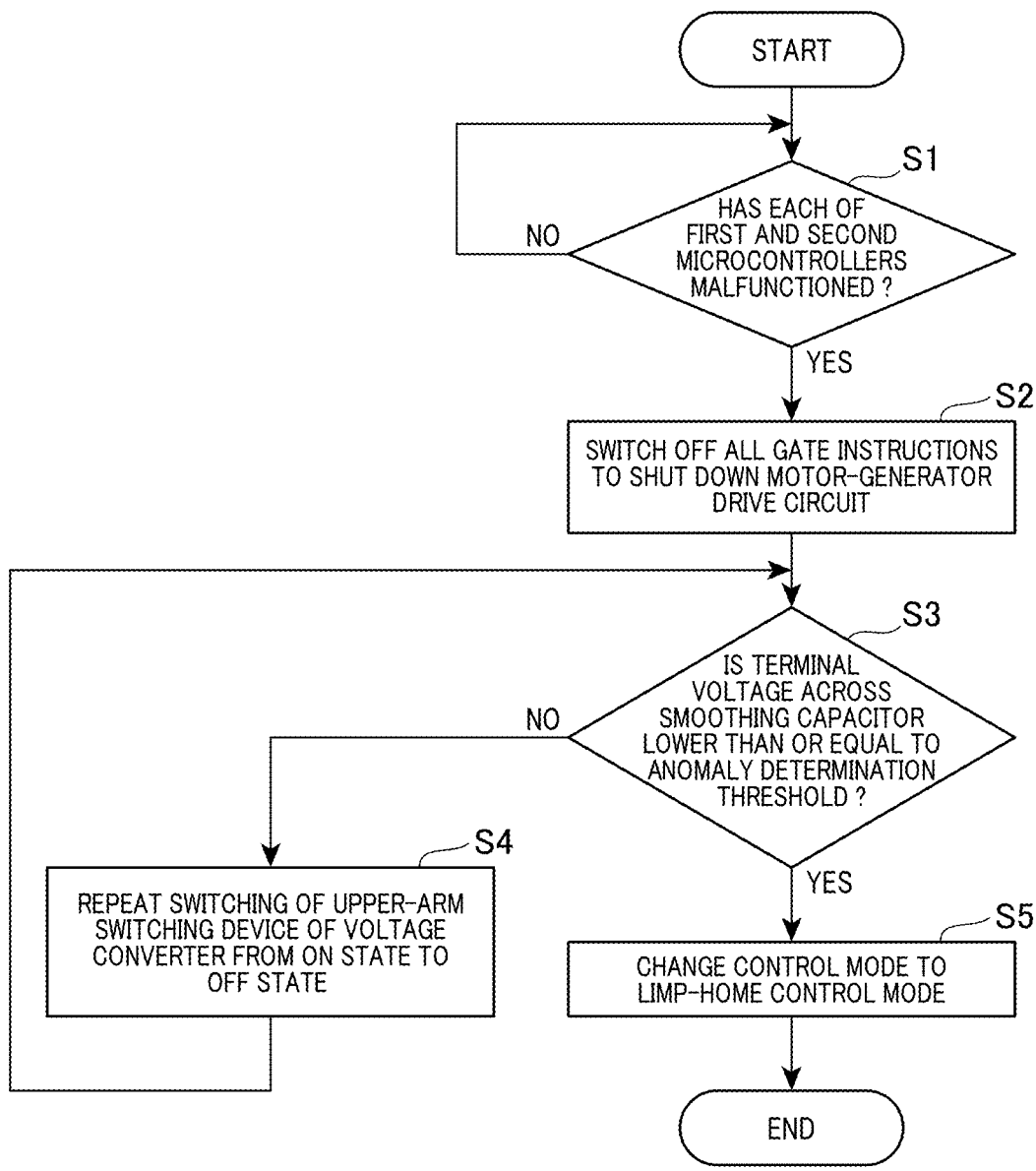
FIG. 2 is a flowchart illustrating a fail-safe control routine according to the exemplary embodiment.

FIG. 2 is a flowchart illustrating a fail-safe control routine cyclically carried out by the control apparatus 10.

The microcomputer 100 of the control apparatus 10 serves as the malfunction determiner to determine whether each of the first and second microcontrollers 101A and 102A has malfunctioned in step S1.

In response to determination that none of the first and second microcontrollers 101A and 102A has malfunctioned (NO in step S1), the microcomputer 100 terminates the fail-safe control routine.

Otherwise, in response to determination that the second microcontroller 102A has for example malfunctioned, such as determination that there is a failure of one or more functions in the second microcontroller 102A (YES in step S1), the microcomputer 100 serves as the malfunction determiner to output, to the ASIC 11, the signal indicative of the malfunction of the second microcontroller 102A.

Upon determination that at least one of the first and second microcontrollers 101A and 102A has malfunctioned in step S1, the microcomputer 100 of the control apparatus 10 switches off all the gate instructions, i.e., on/off instructions to all the switching devices included in the first inverter 4, the second inverter 5, and the voltage converter 6 in step S2. Specifically, the microcomputer 100 controls all the switching devices included in the first inverter 4, the second inverter 5, and the voltage converter 6 off in step S2, thus shutting down a motor-generator drive circuit, which includes the first inverter 4, the second inverter 5, and the voltage converter 6.

In response to receiving the signal indicative of the malfunction of the second microcontroller 102A, the ASIC 11 serves as the determiner 11C to determine whether the terminal voltage Vh-VGND across the smoothing capacitor 8, which is monitored by the monitor unit 11A of the ASIC 11, is lower than or equal to the predetermined anomaly determination threshold stored in the storage unit 11B in step S3.

In response to determination that the terminal voltage Vh-VGND across the smoothing capacitor 8 is not lower than or equal to the predetermined anomaly determination threshold, that is, the terminal voltage Vh-VGND across the smoothing capacitor 8 is higher than the predetermined anomaly determination threshold (NO in step S3), the ASIC 11 serves as the determiner 11C to determine that the terminal voltage Vh-VGND across the smoothing capacitor 8 is an anomaly voltage. Then, the ASIC 11 serves as the converter controller 11D to perform the switching control task of repeatedly switching the upper-arm first switching device T61 of the voltage converter 6 from the on state to the off state in step S4.

In step S4, the ASIC 11 performs the switching control task that repeats the switching of the upper-arm switching device T61 of the voltage converter 6 as a controlled target from the on state to the off state, i.e., shutdown state, predetermined times.

Specifically, the ASIC 11 serves as the converter controller 11D to repeatedly output, to the first switching device T61 of the voltage converter 6, the on/off instruction, i.e., the gate instruction, GS1 in step S4. The gate instructions GS1 repeatedly outputted from the ASIC 11 cause the first switching device T61 to be repeatedly switched from the on state to the off state, i.e., shutdown state, a predetermined number of times.

When the operation in step S4 is completed, the fail-safe control routine returns to step S3, and the ASIC 11 performs the determination operation in step S3.

That is, the ASIC 11 iterates the operation in step S4 until the determination in step S3 is affirmed, in other words, the terminal voltage Vh-VGND across the smoothing capacitor 8 has decreased to be lower than or equal to the predetermined anomaly determination threshold.

In response to determination that the terminal voltage Vh-VGND across the smoothing capacitor 8 is lower than or equal to the predetermined anomaly determination threshold (YES in step S5), the ASIC 11 determines that the terminal voltage Vh-VGND across the smoothing capacitor 8 is a normal value. Then, the ASIC 11 changes the control mode for the second motor-generator 3 from a normal travel control mode to the limp-home control mode in step S5. In step S5, the ASIC 11 serves as the limp-home controller 11E to perform the limp-home control task.

Specifically, the ASIC 11, i.e., the limp-home controller 11E, has the map indicative of the correlative relationship between (i) the values, i.e., safety rotational-speed values, of the rotational speed of the second motor-generator 3 and (ii) the values of torque corresponding to the respective safety rotational-speed values; the safety rotational-speed values of the second motor-generator 3 correspond to respective safety traveling-speed values, i.e., low speed values, of the electric vehicle 1 during traveling of the electric vehicle 1 in the limp-home mode.

The ASIC 11, i.e., the limp-home controller 11E, performs, based on the vehicle speed SP measured by the vehicle speed sensor S1 and the map, the limp-home control task of performing on-off switching operations of each of the switching devices T51 to T56 of the second inverter 5 to accordingly perform feedback control of the torque of the second motor-generator 3. The torque feedback control of the second motor-generator 3 causes a value of the vehicle speed SP of the electric vehicle 1, i.e., the rotational speed of the second motor-generator 3, to track a selected one of the safety traveling-speed values, i.e., a corresponding one of the safety rotational-speed values of the second motor-generator 3. The second motor-generator 3, which is controlled based on the limp-home control task, causes the electric vehicle 1 to travel in the limp-home mode.

As described above, the ASIC 11 of the control apparatus 10 according to the exemplary embodiment makes it possible to perform the limp-home control task. This configuration enables, even if it is determined that the second microcontroller 102A has malfunctioned, the first microcontroller 101A, which is operating normally, to constitute an electric-vehicle control system in the electric vehicle 1 without lowering of the fail-safe function, making it possible to constitute the electric-vehicle control system with a relatively lower cost. Additionally, Installing custom functions of the second microcontroller 102A in the ASIC 11 enables a general-purpose computer with a relatively lower cost to be employed as the second microcontroller 102A.

In response to determination that there is a malfunction in the second microcontroller 102A during high-speed running of the electric vehicle 1, the ASIC 11 performs a fail-safe control task of performing on-off switching operations of the upper-arm switching device T61 of the voltage converter 6 to accordingly dissipate regenerative power generated by the second motor-generator 3 in the regenerative mode. This prevents the regenerative power from being stored in the smoothing capacitor 8 to accordingly prevent the occurrence of an overvoltage across the smoothing capacitor 8. This therefore makes it possible to change the control mode for the second motor-generator 3 from the normal travel control mode to the limp-home control mode even if the first or second microcontroller 101A or 102A has malfunctioned.

The exemplary embodiment shows an example where the ASIC 11 is installed in the second MG-ECU 102, but the present disclosure is not limited thereto. For example, the ASIC 11, which can serve as a control unit for controlling the first motor-generator 2, can be installed in the first MG-ECU 10. Specifically, the ASIC 11 can be installed in at least one of the first MG-ECU 101 and the second MG-ECU 102.

The exemplary embodiment shows an example where the electric vehicle 1 includes two motor-generators, such as the first and second motor-generators 2 and 3, but the present disclosure is not limited thereto. That is, the present disclosure is not limited to the number of motor-generators in an electric vehicle as motor-generators for traveling of the electric vehicle.

Figure 3:
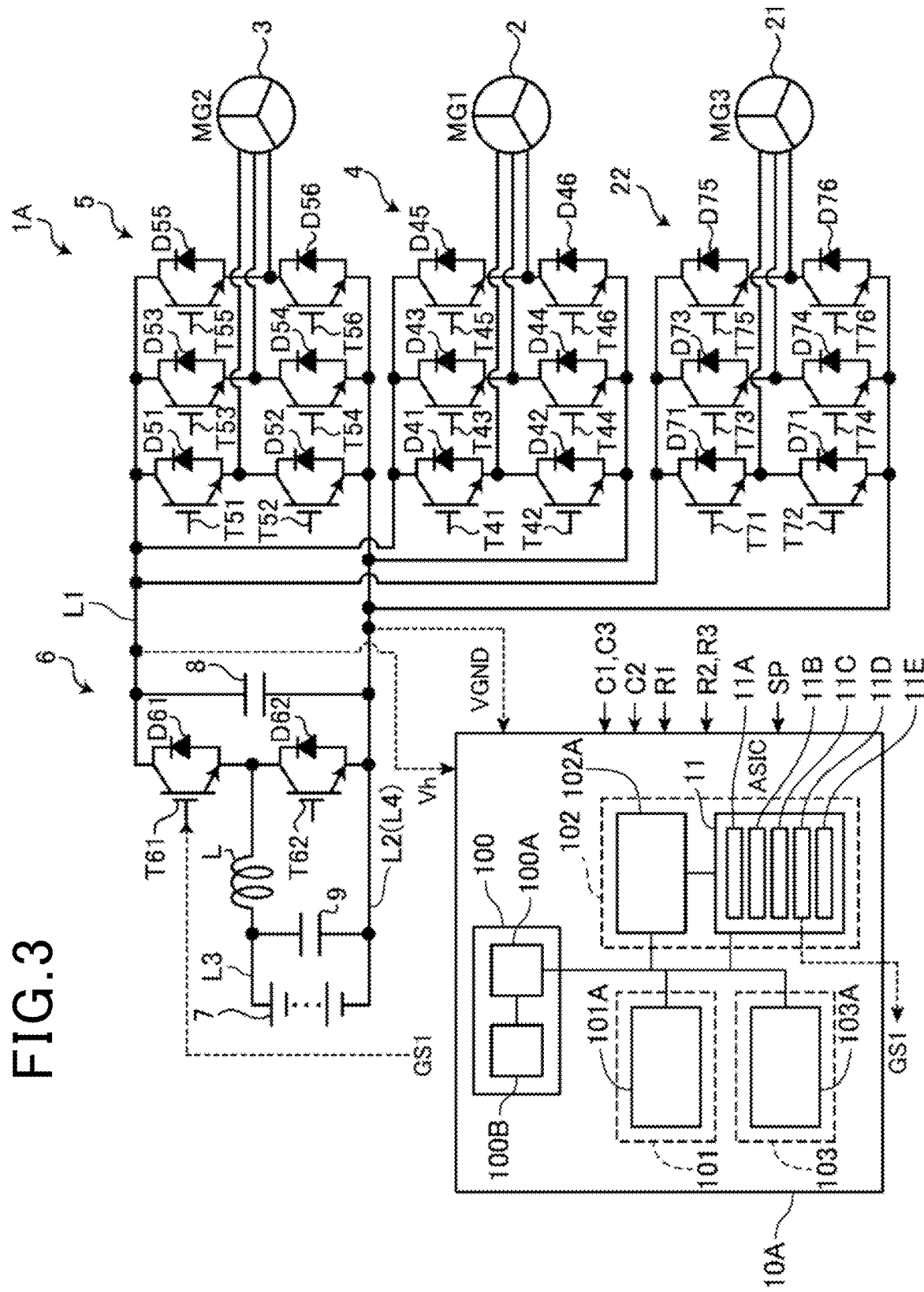
FIG. 3 is a diagram illustrating a schematic configuration of an electric-vehicle control system according to a first modification of the exemplary embodiment of the present disclosure.

For example, FIG. 3 illustrates an electric vehicle 1A according to the first modification of the exemplary embodiment in which three motor-generators for traveling of the electric vehicle 1A are installed.

Figure 4:
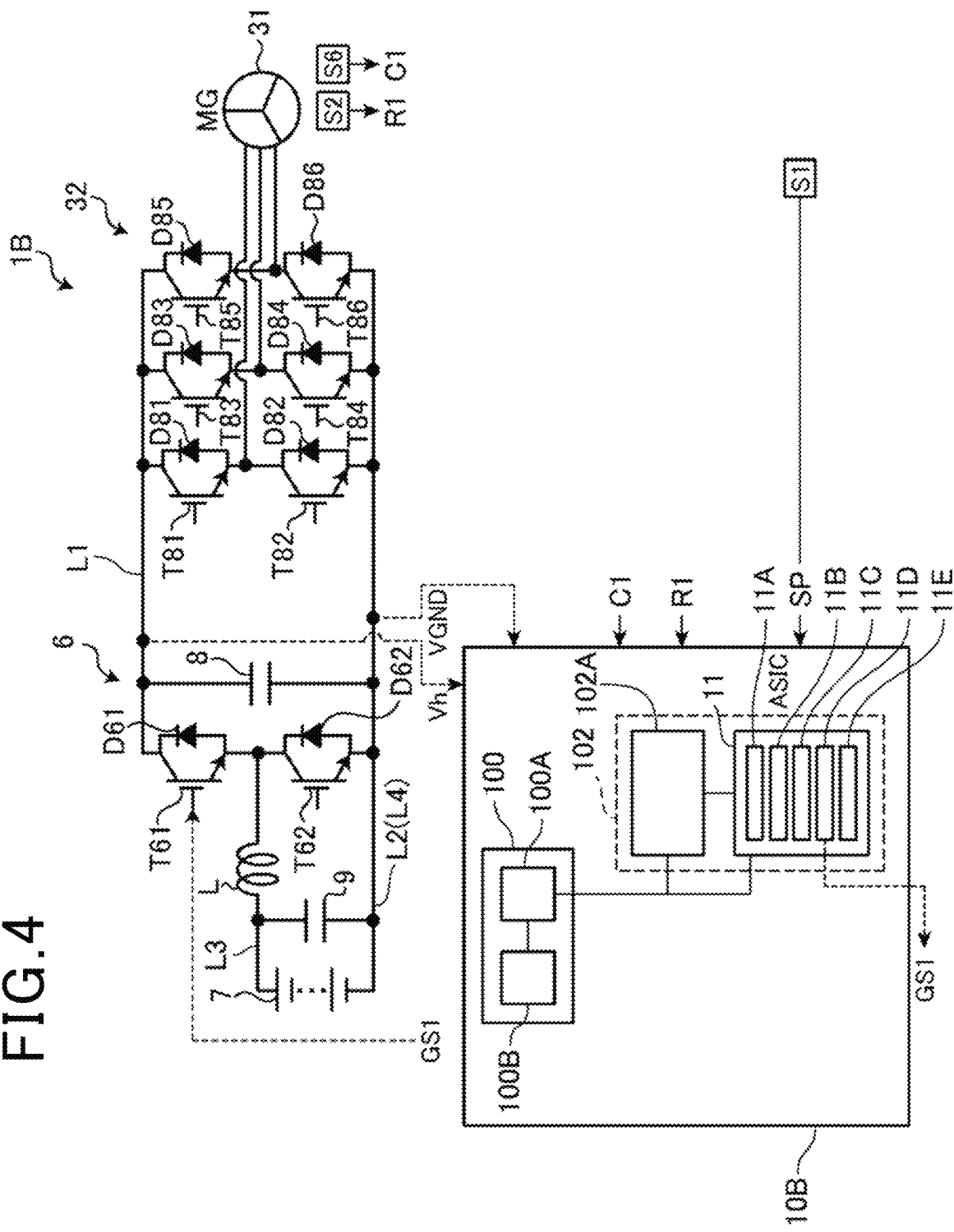
FIG. 4 is a diagram illustrating a schematic configuration of an electric-vehicle control system according to a second modification of the exemplary embodiment of the present disclosure.

FIG. 4 illustrates an electric vehicle 1B according to the second modification of the exemplary embodiment in which a single motor-generator for traveling of the electric vehicle 1B is Installed.

The electric vehicle 1A according to the first modification includes, as illustrated in FIG. 3, the first motor-generator (MG1) 2, the second motor-generator (MG2) 3, a third motor-generator (MG3) 21, the first inverter 4, the second inverter 5, the voltage converter 6, the battery 7, and a control apparatus 10A. In FIG. 3, illustration of the sensors S1 to S7 is omitted. The various sensors include a third rotational angle sensor configured to measure a rotational angle R2 of the third motor-generator 21, i.e., its rotor, and a third current sensor configured to measure a phase current C3 flowing through each of the three-phase coils of the third motor-generator 21.

The first motor-generator 2, the second motor-generator 3, and the third motor-generator 21 of the electric vehicle 1A drive the driving wheels of the electric vehicle 1A. For example, the first motor-generator 2 and the second motor-generator 3 are configured to drive the front wheels of the electric vehicle 1A, and the third motor-generator 12 is configured to drive the rear wheels of the electric vehicle 1A.

The third inverter 22, which is similar to the first inverter 4, is comprised of an electric circuit, i.e., an inverter circuit, that includes a plurality of switching devices for supplying phase currents to the respective three-phase coils of the third motor-generator 21.

Specifically, the third inverter 22 is comprised of six switching devices T71 to T76 and six diodes D71 to D76

Because the third inverter 22 is electrically connected to the battery 7 through the voltage converter 6, the third motor-generator 21 can operate based on the DC power supplied from the battery 7.

The third inverter 22 is configured to convert the DC power, i.e., the DC voltage, which is supplied from the battery 7 and boosted by the voltage converter 6, into AC power, i.e., three-phase AC voltages, and supply the three-phase AC voltages to the third motor-generator 21, thus driving the third motor-generator 21.

For example, when the DC voltage boosted by the voltage converter 6 is applied to the third inverter 22, a third motor-generator control apparatus, i.e., a third MG-ECU, described later, is configured to perform complementary on-off operations of each of the first pair of switching devices T71 and T72, the second pair of switching devices T73 and T74, and the third pair of switching devices T75 and T76 while adjusting the percentage of the on-duration of each switching device, thus supplying the three-phase AC voltages to the third motor-generator 21. The third motor-generator 21 generates, based on the three-phase AC voltages, a rotating magnetic field in the stator through the three-phase coils. Repulsion/attraction between the rotating magnetic field generated in the stator and the permanent magnets of the rotor cause the third motor-generator 21, i.e., the rotor of the third motor-generator 21, rotatably drive, thus generating torque.

The control apparatus 10A includes, in addition to the microcomputer 100, the first MG ECU 101, and the second MG ECU 102, a third MG ECU 103 for controlling the voltage converter 6, the third inverter 22, and the third motor-generator 21. The third MG ECU 103 includes a third microcontroller 103A serving as a control unit for controlling, based on the measurement signals outputted from the various sensors and inputted to the control apparatus 10A, the voltage converter 6, the third inverter 22, and the third motor-generator 21.

The ASIC 11 illustrated in FIG. 3 is installed in the second MG ECU 102 like the exemplary embodiment, but can be installed in at least one of the first to third MG-ECUs 101 to 103.

In the electric vehicle 1A equipped with the first to third motor-generators 2, 3, and 21 and the first to third MG-ECUs 101, 102, and 103 for controlling the respective first to third motor-generators 2, 3, and, 21, the ASIC 11 can perform the limp-home control task when at least one of the first to third microcontrollers 101 to 103 has malfunctioned during traveling of the electric vehicle 1A.

The electric vehicle 1B according to the second modification includes, as illustrated in FIG. 4, a motor-generator (MG) 31, an inverter 32, the voltage converter 6, the battery 7, and a control apparatus 10B. In FIG. 4 as compared with FIG. 3, no sensors S3 and S7 are provided in the electric vehicle 1B, and the sensor S2 serves as a rotational angle sensor for measuring the rotational angle R1 of the motor-generator 31, i.e., its rotor, and the sensor S6 serves as a current sensor for measuring the phase current C1 flowing through each of the three-phase coils of the motor-generator 2.

The motor-generator 31 drives the driving wheels of the electric vehicle 1B. For example, the motor-generator 31 is configured to drive the front wheels or the rear wheels of the electric vehicle 1B.

The inverter 32, which is similar to the first inverter 4, is comprised of an electric circuit, i.e., an inverter circuit, that includes a plurality of switching devices for supplying phase currents to the respective three-phase coils of the motor-generator 31.

Specifically, the inverter 32 is comprised of six switching devices T81 to T86 and six diodes D81 to D86

Because the inverter 32 is electrically connected to the battery 7 through the voltage converter 6, the motor-generator 31 can operate based on the DC power supplied from the battery 7.

The inverter 32 is configured to convert the DC power, i.e., the DC voltage, which is supplied from the battery 7 and boosted by the voltage converter 6, into AC power, i.e., three-phase AC voltages, and supply the three-phase AC voltages to the motor-generator 31, thus driving the motor-generator 31.

For example, when the DC voltage boosted by the voltage converter 6 is applied to the inverter 32, a motor-generator control apparatus, i.e., an MG-ECU, described later, is configured to perform complementary on-off operations of each of the first pair of switching devices T81 and T82, the second pair of switching devices T83 and T84, and the third pair of switching devices T85 and T86 while adjusting the percentage of the on-duration of each switching device, thus supplying the three-phase AC voltages to the motor-generator 31. The motor-generator 31 generates, based on the three-phase AC voltages, a rotating magnetic field in the stator through the three-phase coils. Repulsion/attraction between the rotating magnetic field generated in the stator and the permanent magnets of the rotor cause the motor-generator 31, i.e., the rotor of the motor-generator 31, to be rotatably driven, thus generating torque.

The control apparatus 10B includes the microcomputer 100 and the second MG ECU 102 set forth above. The second MG ECU 102 serves as a control unit for controlling the voltage converter 6, the inverter 32, and the motor-generator 31.

The ASIC 11 is installed in the second MG ECU 102 like the exemplary embodiment.

In the electric vehicle 1B equipped with the single motor-generator 31 and the single MG-ECU 102 for controlling the motor-generator 31, the ASIC 11 can perform the limp-home control task when the microcontroller 102 has malfunctioned during traveling of the electric vehicle 1B.

The functions of one element in the exemplary embodiment can be implemented by plural elements, and the functions that plural elements have can be implemented by one element. The functions of plural elements in the exemplary embodiment can be implemented by one element, and one function implemented by plural elements can be implemented by one element. At least part of the structure of the exemplary embodiment can be replaced with a known structure having the same function as the at least part of the structure of the corresponding embodiment. A part of the structure of the exemplary embodiment can be eliminated, and at least part of the structure of the exemplary embodiment can be added to or replaced with the structure of the exemplary embodiment.

The present disclosure can be implemented by, in addition to the each control apparatus for an electric vehicle, various measures that include (i) electric vehicle control systems, each of which includes the corresponding control apparatus, (ii) programs, each of which causes a computer to serve as the corresponding control apparatus, (iii) non-transitory storage media, such as semiconductor memories, each of which stores at least one of the programs, or (iv) electric-vehicle control methods.

The invention claimed is:

1. A control apparatus for an electric vehicle, the control apparatus comprising:
   a first control unit configured to control at least one motor-generator, the motor-generator being configured to drive one or more driving wheels of an electric vehicle using an alternating-current voltage based on a direct-current voltage that is boosted by a voltage converter and supplied thereto through a smoothing capacitor, the voltage converter comprising an upper-arm switch and a lower-arm switch;
   a malfunction determiner configured to determine whether the first control unit has malfunctioned during traveling of the electric vehicle; and
   a second control unit provided as a redundant control unit for the first control unit,
   the second control unit being configured to:
      monitor a terminal voltage across the smoothing capacitor;
      determine whether the monitored terminal voltage across the smoothing capacitor is lower than or equal to a predetermined anomaly determination threshold in response to determination that the first control unit has malfunctioned;
      perform a switching control task of repeatedly switching between an on state and an off state of the upper-arm switching device of the voltage converter in response to determination that the monitored terminal voltage across the smoothing capacitor is higher than the predetermined anomaly determination threshold;
      determine whether the switching control task causes the monitored terminal voltage across the smoothing capacitor to be lower than or equal to the predetermined anomaly determination threshold; and
      control, in response to determination that the switching control task causes the monitored terminal voltage across the smoothing capacitor to be lower than or equal to the predetermined anomaly determination threshold, the at least one motor-generator to perform a limp-home control task of the electric vehicle.

2. The control apparatus according to claim 1, wherein:
   the at least one motor-generator comprises a first motor-generator and a second motor-generator;
   the first control unit is configured to control the second motor-generator;
   the control apparatus comprises a motor-generator control unit for controlling the first motor-generator;
   the malfunction determiner is configured to determine whether each of the first control unit and the motor-generator control unit has malfunctioned during traveling of the electric vehicle; and
   the second control unit is configured to:
      determine whether the monitored terminal voltage across the smoothing capacitor is lower than or equal to the predetermined anomaly determination threshold in response to determination that at least one of the first control unit and the motor-generator control unit has malfunctioned during traveling of the electric vehicle;
      determine whether the switching control task causes the monitored terminal voltage across the smoothing capacitor to be lower than or equal to the predetermined anomaly determination threshold; and
      control, in response to determination that the switching control task causes the monitored terminal voltage across the smoothing capacitor to be lower than or equal to the predetermined anomaly determination threshold, at least one of the first motor-generator and the second motor-generator to perform the limp-home control task of the electric vehicle.

3. The control apparatus according to claim 2, wherein:
   the first control unit is a microcontroller having a control function of controlling the second motor-generator;
   the second control unit is an application specific integrated circuit configured to perform at least part of the control function of the microcontroller and the limp-home control task; and
   the second control unit is configured to control, in response to determination that the switching control task causes the monitored terminal voltage across the smoothing capacitor to be lower than or equal to the predetermined anomaly determination threshold, the second motor-generator to perform the limp-home control task of the electric vehicle.

4. The control apparatus according to claim 1, wherein:
   an inverter is installed in the electric vehicle, the inverter comprising a plurality of switching devices for converting the direct-current voltage into the alternating-current voltage;
   the second control unit has a map indicative of a correlative relationship between (i) safety rotational-speed values of a rotational speed of the at least one motor-generator and (ii) values of torque corresponding to the respective safety rotational-speed values, the safety rotational-speed values of the at least one motor-generator corresponding to respective safety traveling-speed values of the electric vehicle during traveling of the electric vehicle in a limp-home mode; and
   the second control unit is configured to perform, based on a measured speed of the electric vehicle and the map, the limp-home control task of performing on-off switching operations of each of the plurality of switching devices of the inverter to accordingly perform feedback control of torque of the at least one motor-generator, the torque feedback control of the at least one motor-generator causing a value of the rotational speed of the at least one motor-generator corresponding to a value of a measured speed of the electric vehicle to track a selected one of the safety rotational-speed values.

* * * * *